June 30, 1953  G. HERZOG  2,643,543
VISCOSITY MEASURING DEVICE
Filed Sept. 4, 1948  3 Sheets-Sheet 1

INVENTOR.
GERHARD HERZOG
BY Daniel Stryker
ATTORNEY

June 30, 1953  G. HERZOG  2,643,543
VISCOSITY MEASURING DEVICE
Filed Sept. 4, 1948  3 Sheets-Sheet 2

INVENTOR.
GERHARD HERZOG
BY
Daniel Stryker
ATTORNEY

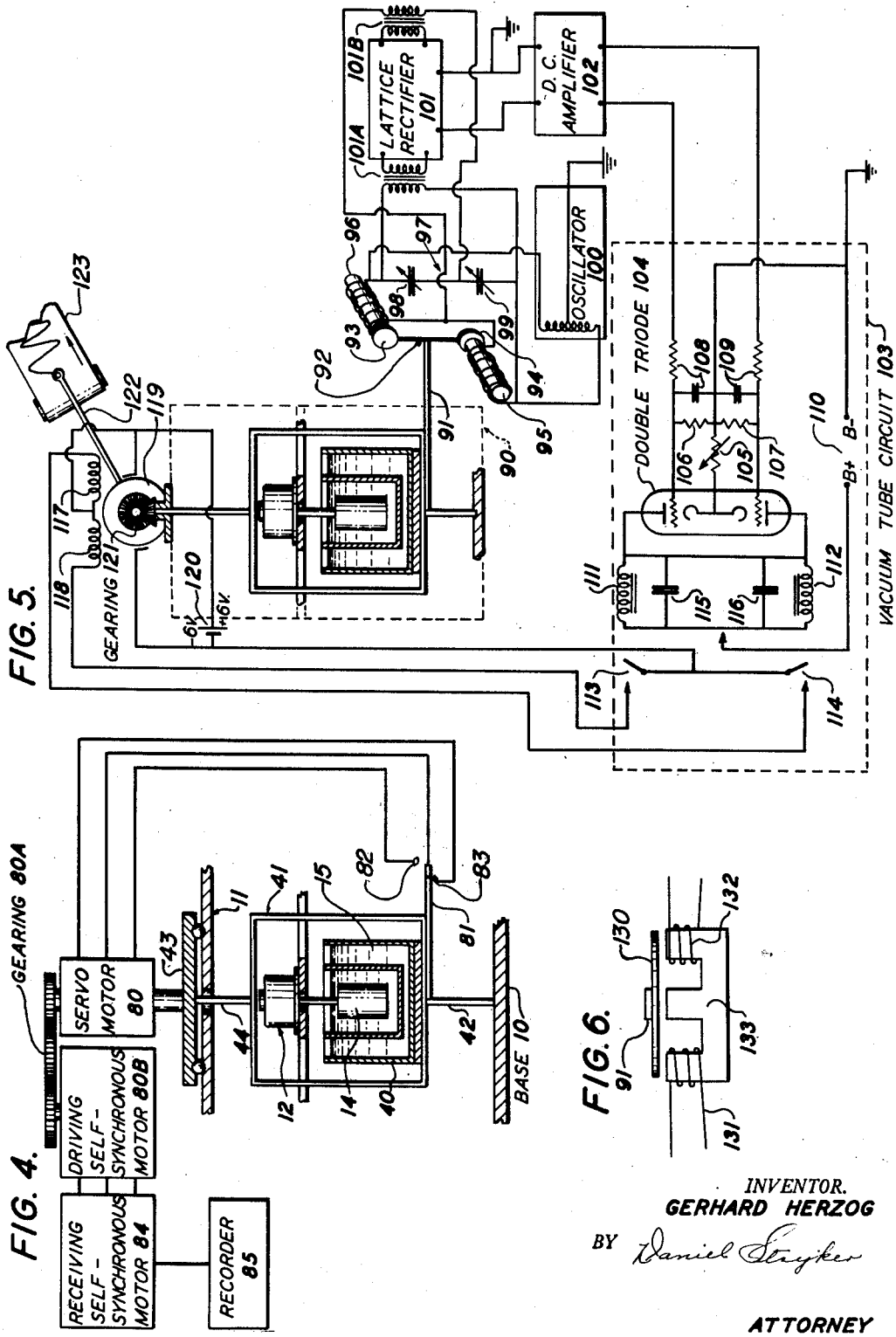

Patented June 30, 1953

2,643,543

UNITED STATES PATENT OFFICE 2,643,543

VISCOSITY MEASURING DEVICE

Gerhard Herzog, Houston, Tex., assignor to The Texas Company, New York, N. Y., a corporation of Delaware Application September 4, 1948, Serial No. 47,803

6 Claims. (Cl. 73—59)

This invention relates to viscosity measurement and provides improved apparatus for this purpose. The preferred instrument of the invention is a recording viscosimeter that produces a continuous record of viscosity changes in a flowing stream or in a batch of liquid.

There is a need, heretofore not satisfied, for a reliable viscosimeter for industrial use to give a continuous indication and preferably a continuous record of viscosity changes. By way of example, there are at least twenty-five places in a large oil refinery at which continuous recording of viscosity changes in liquid streams is wanted. In other instances a continuous record of both viscosity and viscosity index is useful, the term "viscosity index" being defined as the change of viscosity for a given temperature change.

There is also a need for a reliable indicating (and preferably recording) viscosimeter for use in drilling mud research and analysis. Many such muds undergo viscosity changes upon agitation before reaching a constant value and it is important to know what this final value is and how long it takes to attain it.

The instant invention fulfills the foregoing needs and provides an improved apparatus of the type in which the liquid whose viscosity is to be determined is placed in a container and there agitated by means of a rotor. The container is capable of limited rotation, against spring action, on the same axis as the rotor. For a given degree of agitation, the greater the viscosity of the liquid, the greater the rotation of the container. In accordance with the invention, the container is rotatably mounted on a support which has the same axis of rotation as the container, the relative rotation of support and container being restricted by a spring member which connects them. This may be a torsion spring, or one operating in tension or compression. In any case, the support is rotated so that the container maintains a substantially constant position, and the angular movement of the support becomes the measure of the viscosity of the liquid. The preferred form of the apparatus is provided with a servo system which is actuated by the rotational movement of the container and automatically rotates the support in a direction tending to counteract the rotation of the container, thus tending to hold the latter in a fixed position. Indicating and preferably recording means are coupled to the support so that its movements are measured, thus indirectly measuring viscosity.

It is frequently important to determine viscosity of a liquid at a given temperature, and to this end the preferred form of the apparatus has a liquid bath or jacket in heat-conductive relationship with the container and rotatable with it on the support.

One form of the viscosimeter of the invention has a heat exchanger. A stream of the liquid undergoing investigation flows first through the exchanger and then through the container, and thermostatic control means are provided for holding the liquid at constant temperature.

A further modification includes two viscosimeters, in series or parallel, through which the liquid flows continuously. In the parallel arrangement the stream is split, and the two parts subjected to investigation simultaneously. In each viscosimeter (whether the parallel or series arrangement is employed) the liquid is investigated at a different temperature, so that both viscosity and viscosity index are determined.

These and other aspects of my invention are explained in detail with reference to the accompanying drawings of which:

Fig. 4 is a block diagram illustrating the use of two self synchronous motors for driving a recorder to correspond to the support movement;

Fig. 5 is a diagram illustrating the application of a different type of servo mechanism in a recording viscosimeter of the invention; and Fig. 6 is a diagram of another type of means for sensing unbalance of the servo system and applying a corrective signal.

Figure 1:
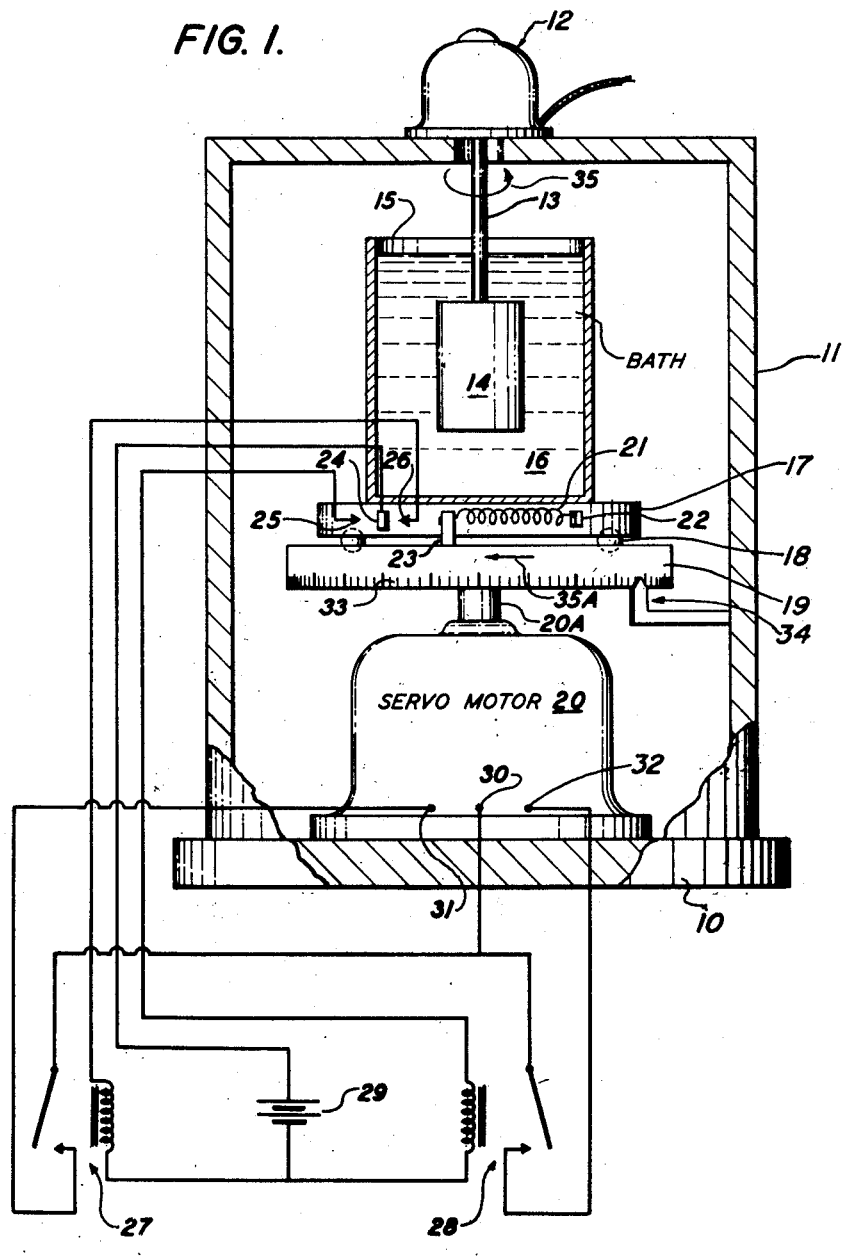
Fig. 1 is a diagram of a simple form of indicating viscosimeter provided with a servo system.

The viscosimeter shown in Fig. 1 comprises a base 10 from which rises a rigid frame 11. A motor 12, say a synchronous motor operating at substantially constant speed is mounted on the top of the frame with its rotational axis upright. Its shaft 13 extends downwardly and carries a co-axial rotor 14 rigidly mounted on its lower end. Preferably this rotor is simply a cylinder. The cylinder rotates in one direction on its axis in a cylindrical container 15 which is open on top and filled with a liquid or suspension 16 undergoing investigation. The container is affixed to a table 17 upon which it rests. A ball race 18 permits this table to rotate on another table 19 which supports it. The second or supporting table is mounted rigidly on the upper end of the upright shaft 20A of a servomotor 20, in this case a reversible induction motor provided with shading poles (not shown).

The rotation of one table with respect to the other is restricted by a coil spring 21. One end of the spring is attached to a radial projection 22 on the upper table; the other end is attached to an upright projection 23 of the lower table, so that the spring is held about horizontal.

An arm 24 of a double throw switch is rigidly mounted on the upper table between a pair of contacts 25, 26 which are stationary, so that as the upper table rotates it brings the arm against one or the other of the contacts. The contacts are connected respectively to the coils of relay operated switches 27, 28, the circuit being completed through a common battery 29 back to the switch arm.

The switch 27 controls a circuit to the common terminal 30 and the clockwise terminal 31 of a shading coil (not shown) in the servomotor. The switch 28 controls a circuit to the common terminal 30 and the counter-clockwise terminal 32 of another shading coil (not shown) in the servomotor.

The rotor, the container, the two tables and the servomotor are co-axial. Both tables are circular in plan, and the edge of the lower table is provided with a graduated scale 33 so that the degree of rotation of the lower table may be read at a stationary pointer 34 mounted beside the scale on the frame.

In operation, the rotor is driven in a direction 35 which tends to tense the spring. The greater the viscosity of the liquid, the greater will be the rotational moment on the container and the upper table exerted by the rotor through the liquid, and the greater the tension on the spring and the degree of rotation of one table with respect to the other. An increase of viscosity of the liquid therefore pushes the arm 24 to the contact 26. When this occurs, the shading coil between the clockwise terminal 31 and the common terminal 30 is energized and the servomotor tends to turn clockwise, as viewed from above (see the arrow 35A), until the contact 24, 26 is broken, when the motor is stopped. The increase of viscosity is thus shown by the rotation of the scale 33 with respect to the pointer 34. If there is a decrease in viscosity, the reverse action occurs, i. e. the supporting table 19 is moved counter-clockwise (to the left as viewed from above in Fig. 1).

Figure 2:
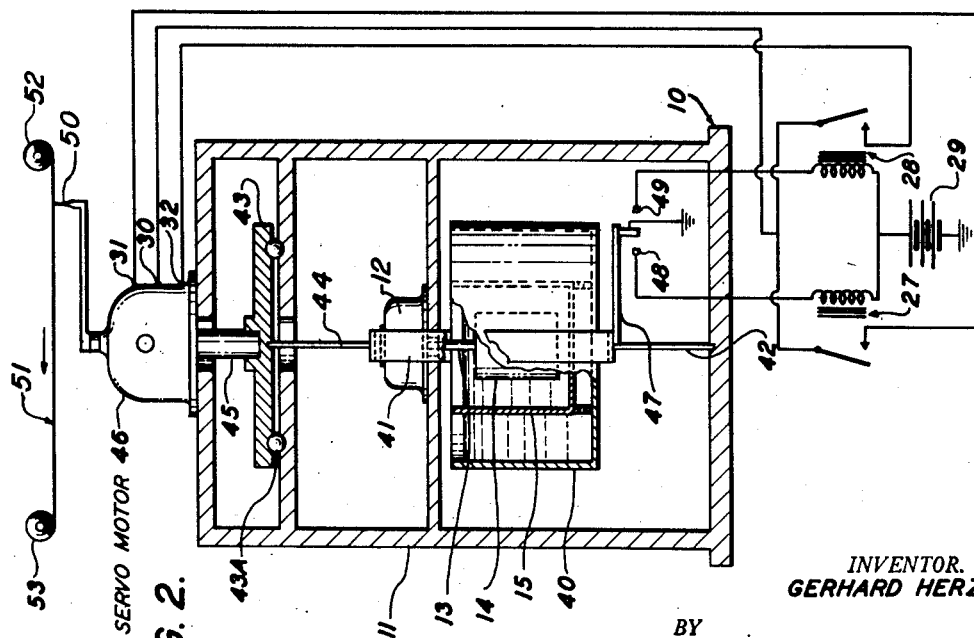
Fig. 2 is a diagram of another type of viscosimeter of the invention, provided with continuous recording means.

Fig. 2 shows another form of the apparatus of Fig. 1. The rotor 14 is mounted on the vertical shaft 13 of the constant speed motor 12. It turns in the co-axial cylindrical container 15, but the container is disposed inside a co-axial cylindrical jacket 40 filled with liquid maintained at constant temperature. Instead of resting on a ball race supported by a table, the container of Fig. 2, and its jacket 40 rest in a yoke 41. This is a skeleton rectangle (see Fig. 4) which is secured to the base 10 by a co-axial torsion member 42 (say a wire) and to a supporting table 43 (which rotates on a ball race 43A on the frame above the yoke) by a second co-axial torsion member 44. The yoke passes around and above the rotor drive motor.

The supporting table 43 is keyed to the shaft 45 of a vertical servomotor 46 mounted on the frame above the supporting table.

The yoke carries a radial switch arm 47 of a double throw switch provided with contacts 48, 49 between which the arm moves.

The servo system of Fig. 2 is the same as that of Fig. 1 and it operates in the same way. The servomotor is a reversible induction motor operating on the shading pole principle. It is controlled by the same relay circuit as that of Fig. 1, except that the return from the battery 29 to the switch arm 27 is through ground. The rotational positions of the supporting table and of the servomotor (the two are the same) are continuously recorded by a pen 50 which moves laterally on a chart 51 that rolls from a head spool 52 to a tail spool 53, thus giving a continuous record of the viscosity of the liquid in the container.

In petroleum refinery applications, where the instrument of Fig. 2 is employed to measure and record the viscosity of successive portions of a liquid stream, the stream is fed continuously through the container or cup. In mud investigations, the cup is filled with a batch of the mud and then a continuous record of viscosity of the mud (undergoing agitation by the rotor) is made as a plot against time. Generally speaking, drilling muds change viscosity with agitation but eventually reach a constant value.

In the apparatus of Fig. 2, the torsion member acts in place of the spring of Fig. 1, and tends to restrict the rotational movement of the container with respect to the rotatable support. Its use tends to reduce friction in the system and is preferred over the other types of spring for this reason.

Figure 3:
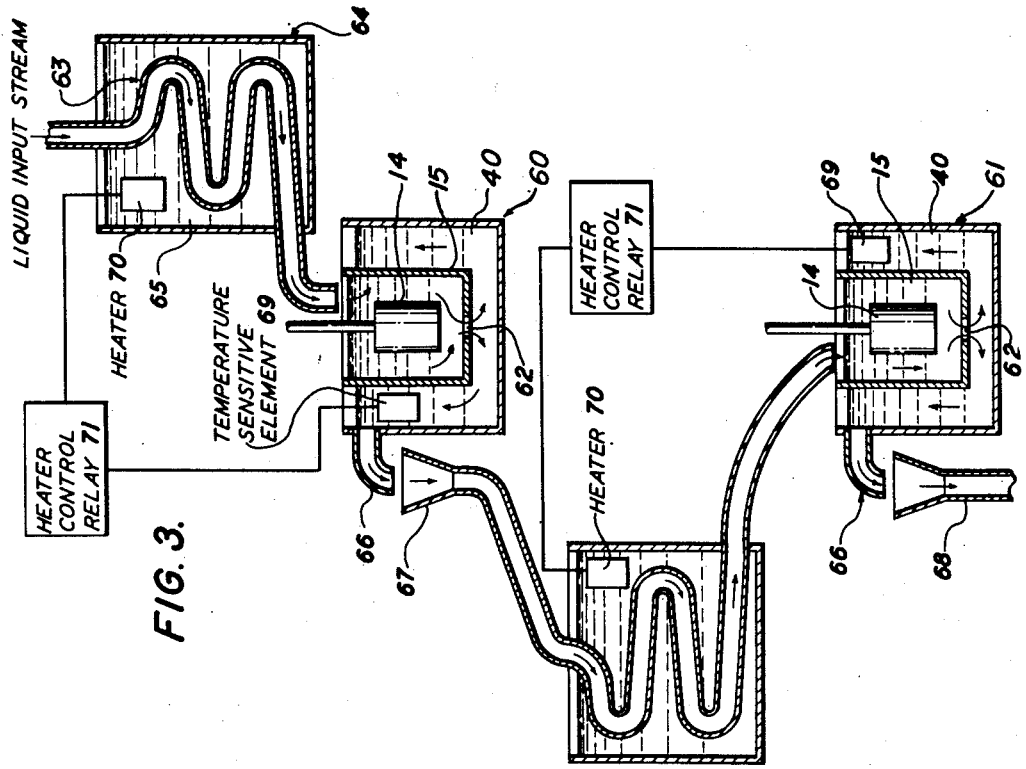
Fig. 3 is a flow diagram illustrating the use of a thermostatic control means in conjunction with viscosity measurements of a flowing stream and the use of two recording viscosimeters of the invention in series so as to determine viscosity index in addition to viscosity.

Fig. 3 illustrates a form of the apparatus adapted to record the changing viscosity of a flowing liquid stream and also to determine changes in viscosity index. The apparatus employs two recording viscosimeters 60, 61 of the type illustrated in Fig. 2 and shown partially in Fig. 3. Each is provided with a rotor 14 which turns in a cup 15 which is mounted within a jacket 40. The bottom of the cup is provided with an opening 62 into the jacket. A liquid stream, say the bottoms from a fractionating column, is led into the cup of the first viscosimeter through a coil 63 of a heat exchanger 64 having a jacket or bath 65 through which the coil passes. The stream flowing out of the bottom of the cup in the first viscosimeter passes upward in the jacket 40 to an outflow nipple 66 which discharges into the inflow line 67 of a second heat exchanger identical with the first. The liquid passes through the coil of this second heat exchanger into the second viscosimeter, through the second viscosimeter as in the case of the first and thence to a final discharge line 68.

A temperature sensitive element 69, say a mercury regulator, is immersed in the jacket of the first viscosimeter as shown, or in the cup of the viscosimeter. It controls a heating element 70 in the jacket of the first heat exchanger by means of a relay 71. Thus the temperature of the liquid in the viscosimeter is used to control the temperature of the inflowing liquid, with the result that the temperature of the liquid in the cup is kept constant.

The second viscosimeter has a similar temperature control means which operates upon the liquid entering its cup. However, the second control means is set so that the temperature in the second cup is kept at a different level, usually higher. The first viscosimeter thus records the viscosity of the liquid at one temperature while the second viscosimeter records the viscosity of the liquid at a different temperature. As long as the curves obtained with the two viscosimeters for the same succeeding portions of a stream are the same there is no change in viscosity index, and the difference between the two curves under these conditions is a measure of the viscosity index.

If desired the two viscosity records are plotted side by side.

Fig. 4 illustrates a modification of the apparatus of Fig. 2 with a somewhat different servo system, in that the servomotor 80 which controls the rotation of the support or yoke 41 is connected directly or through gearing 80A to a self synchronous driving motor 80B. Such motors are well known and frequently take the form of a transformer provided with a rotor and a stator provided with multiple taps. The direction of rotation of the servomotor is controlled, as in the previous cases, by a switch arm 81 mounted on the yoke to swing between a pair of contact points 82, 83, the arrangement being such that the servomotor is driven to hold constant the rotational movement of the yoke with respect to the frame. The self synchronous drive motor 80B controls the movement of a receiving self synchronous motor 84, which drives the pen on a recorder 85, the overall result being the same as with the apparatus of Fig. 2.

The viscosimeter itself in the apparatus of Fig. 5 is the same as that of Fig. 2, but the servo-linkage is different. Thus the viscosimeter 90 of Fig. 5 has a radial arm 91 on the yoke which carries an insulating cross bar 92 with copper disks 93, 94 mounted on opposite ends. These disks control, respectively, a pair of variable impedances 95, 96 each comprising a coil wound on a core. The two impedances are so held that as the arm moves a disk toward the end of one core it moves the other disk away from the end of the other core. The two impedances are connected in a carrier system bridge network 97 with condensers 98, 99 for balancing purposes. The bridge network is energized by alternating current from an oscillator 100. A phase-sensitive lattice rectifier or modulator 101 is connected across the output of the bridge and to the oscillator through appropriate transformers 101A, 101B. The output of the rectifier is connected through a D. C. amplifier 102 to a vacuum tube switching circuit 103.

Movement of the copper disks due to movement of the arm brings about bridge unbalance with a relatively large voltage appearing across the bridge at the rectifier. This difference, after rectification and amplification, is impressed on the switching circuit.

The switching circuit employs a double triode 104 with a common variable cathode bias resistor 105 and the usual grid resistors 106, 107. A damping effect is achieved by R-C combination 108, 109 which suppress sharp transient voltage changes that might otherwise cause the apparatus to hunt. Voltage is supplied by a B battery 110 in conventional manner. The plates of the double triode are connected respectively to solenoids 111, 112 of switches 113, 114. These are shunted by condensers 115, 116 which act as A. C. filters or ripple removers to improve the holding quality of the solenoids and at the same time eliminate any A. C. component which may have leaked into the circuit.

The solenoids control the switches, which are of single pole type, and these switches are connected respectively to the field coils 118, 117 of a reversible D. C. motor 119, which is energized by a D. C. source 120 which also energizes the armature of the motor.

The shaft of the motor is linked through gearing 121 to the upper torsion member of the viscosimeter. The shaft also carries a pen arm 122 of a continuous strip recorder 123.

When an unbalance voltage, corresponding in direction to either an increase or decrease of viscosity sensed by the viscosimeter, is applied to the input of the vacuum tube circuit as a result of the movement of the arm, either one or the other of the triodes will become conductive and its associated switch will be thrown, thus activating the motor field and rotating the motor in a direction tending to reduce the displacement of the container in the viscosimeter, and producing a record of viscosity at the recorder, as in the previous instances. If there is no unbalance both switches will be open. One switch is closed by a negative unbalance, the other by a positive unbalance.

A number of other means for sensing a movement indicative of viscosity change may be employed. For example, as shown in Fig. 6, an iron disk 130 is fastened in a horizontal position on the end of the arm 91, and moves over a coil system comprising two coils 131, 132 wound on the extreme legs of an upturned E shaped magnetic core 133. When the disk is in a symmetrical position above the E the impedance of the coils will be equal. When the disk is off center this balance will be disturbed and the amount and direction of this unbalance can be utilized through a vacuum tube amplifier to control the servomotor, as already described.

The viscosimeters of the invention may be calibrated by filling the cup with a series of liquids of known viscosities and noting the corresponding deflections. They are rugged and accurate. In recent operations, operating on a stream of wax distillate in a refinery, the values obtained with a recording viscosimeter of the invention checked within ± one second Saybolt at 210° F. of the results obtained by laboratory testing techniques.

I claim:

1. In a viscosimeter having a container for a liquid the viscosity of which is to be measured, the container being rotatably mounted on an axis, a co-axial rotor disposed within the container and means for driving the rotor, the combination which comprises a support upon which the container is rotatably mounted, said support being rotatable co-axially with the container, springing means connecting the support to the container and permitting restricted rotation of one with respect to the other, a servomotor connected to the support for rotating it, an electrical control connected to the servomotor and actuated by relative rotation of the container with respect to the support and requiring the servomotor to turn in a direction such that the container is maintained in a substantially fixed rotational position, and means for indicating the amount of rotation of the support required to maintain the container in said substantially fixed rotational position.

2. In a viscosimeter having a container for a liquid the viscosity of which is to be measured, the container being rotatably mounted on an axis, a co-axial rotor disposed within the container and means for driving the rotor, the combination which comprises a support upon which the container is rotatably mounted, said support being rotatable co-axially with the container, springing means connecting the support to the container and permitting restricted rotation of one with respect to the other, a servomotor connected to the support for rotating it, an electrical control connected to the servomotor and actuated by a relative rotation of the container with respect to the support and requiring the servomotor to turn in a direction such that the container is maintained in a substantially fixed rotational position, means for continuously recording the amount of rotation of the support required to maintain the container in the substantially fixed rotational position and means for flowing a stream of the liquid through the container while the servomotor is turning.

3. In a viscosimeter having a container for a liquid the viscosity of which is to be measured, the container being rotatably mounted on an axis, a co-axial rotor disposed within the container and means for driving the rotor, the combination which comprises a support upon which the container is rotatably mounted, said support being rotatable co-axially with the container, springing means connecting the support to the container and permitting restricted rotation of one with respect to the other, means connected to the support for rotating the support to hold the container in a substantially constant rotational position, and means for indicating the amount of rotation of the support required to hold the container in the substantially constant rotational position.

4. Apparatus according to claim 3 in which the springing means is a co-axial torsion member which suspends the container from the support.

5. In a viscosimeter having a container for a liquid the viscosity of which is to be measured, the container being rotatably mounted on an axis, a co-axial rotor disposed within the container and means for driving the rotor, the combination which comprises a support upon which the container is rotatably mounted, said support being rotatable co-axially with the container, springing means connecting the support to the container and permitting restricted rotation of one with respect to the other, a servomotor connected to the support for rotating it, an electrical control connected to the servomotor and actuated by relative rotation of the container with respect to the support and requiring the servomotor to turn in a direction such that the container is held in a substantially fixed rotational position, said control including a switch arm mounted to rotate with the container and a pair of stationary contacts between which the arm moves, one contact controlling rotation of the servomotor in one direction and the other controlling rotation of the servomotor in the opposite direction, and means for indicating the amount of rotation of the support required to maintain the container in the substantially fixed rotational position.

6. In a viscosimeter having a container for a liquid the viscosity of which is to be measured, the container being rotatably mounted on an axis, a co-axial rotor disposed within the container and means for driving the rotor, the combination which comprises a support upon which the container is rotatably mounted, said support being rotatable co-axially with the container, springing means connecting the support to the container and permitting restricted rotation of one with respect to the other, a servomotor connected to the support for rotating it, an electrical control connected to the servomotor and actuated by relative rotation of the container with respect to the support and requiring the servomotor to turn in a direction such that the container tends to be maintained in a constant rotational position, said control including a member rotatable with the container and electrical means disposed in inductive relationship with the member so that movement of the member produces electrical unbalance in the means, and means for indicating the amount of rotation of the support required to maintain the container in the constant rotational position.

GERHARD HERZOG.

References Cited in the file of this patent

UNITED STATES PATENTS

| Number | Name | Date |
|---|---|---|
| 1,817,739 | Dintilhac | Aug. 4, 1931 |
| 2,160,606 | Thomas | May 30, 1939 |
| 2,354,299 | Bays | July 25, 1944 |
| 2,357,003 | Hurndall | Aug. 29, 1944 |
| 2,365,339 | Green | Dec. 19, 1944 |
| 2,398,574 | Bell | Apr. 16, 1946 |
| 2,435,416 | Thomson et al. | Feb. 3, 1948 |

FOREIGN PATENTS

| Number | Country | Date |
|---|---|---|
| 843,610 | France | Mar. 27, 1939 |